(12) United States Patent
Fisher et al.

(10) Patent No.: US 11,126,788 B2
(45) Date of Patent: Sep. 21, 2021

(54) FONT CAPTURE FROM IMAGES OF TARGET DECORATIVE CHARACTER GLYPHS

(71) Applicant: ADOBE INC., San Jose, CA (US)

(72) Inventors: Matthew David Fisher, San Carlos, CA (US); Praveen Kumar Dhanuka, Howrah (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/567,724

(22) Filed: Sep. 11, 2019

(65) Prior Publication Data
US 2021/0073323 A1   Mar. 11, 2021

(51) Int. Cl.
| | |
|---|---|
| *G06F 40/109* | (2020.01) |
| *G06K 9/68* | (2006.01) |
| *G06T 3/00* | (2006.01) |
| *G06N 3/08* | (2006.01) |
| *G06K 9/00* | (2006.01) |
| *G06K 9/72* | (2006.01) |
| *G06F 40/16* | (2020.01) |

(52) U.S. Cl.
CPC ............ *G06F 40/109* (2020.01); *G06F 40/16* (2020.01); *G06K 9/00463* (2013.01); *G06K 9/6828* (2013.01); *G06K 9/726* (2013.01); *G06N 3/08* (2013.01); *G06T 3/0006* (2013.01)

(58) Field of Classification Search
None
See application file for complete search history.

(56) References Cited

U.S. PATENT DOCUMENTS

| | | | |
|---|---|---|---|
| 6,678,410 B1* | 1/2004 | Phinney | G06K 15/02 382/181 |
| 2009/0109227 A1* | 4/2009 | Leroy | G06F 40/109 345/467 |
| 2009/0220154 A1* | 9/2009 | Daidoh | G06K 9/346 382/182 |

(Continued)

OTHER PUBLICATIONS

Azadi, S., Fisher, M., Kim, V. G., Wang, Z., Shechtman, E., & Darrell, T. (2018). Multi-content gan for few-shot font style transfer. In Proceedings of the IEEE conference on computer vision and pattern recognition (pp. 7564-7573).

(Continued)

*Primary Examiner* — Kyle R Stork
(74) *Attorney, Agent, or Firm* — Shook, Hardy & Bacon L.L.P.

(57) ABSTRACT

Embodiments of the present invention are directed towards generating a captured font from an image of a target font. Character glyphs of the target font can be detected from the image. A character glyph can be selected from the detected character glyphs. A character mask can be generated for the selected character glyph. The character mask can be used to identify a similar font. A character from the similar font corresponding to the selected character glyph can be transformed to match the character mask. This transformed corresponding character can be presented and used to generate a captured font. In addition, a texture from the image can be applied to the captured font based on the transformed corresponding character.

20 Claims, 12 Drawing Sheets
(4 of 12 Drawing Sheet(s) Filed in Color)

(56) References Cited

U.S. PATENT DOCUMENTS

| | | | | |
|---|---|---|---|---|
| 2014/0253584 A1* | 9/2014 | Harper | .................... | G06T 11/60 |
| | | | | 345/611 |
| 2015/0339273 A1* | 11/2015 | Yang | .................. | G06F 3/04842 |
| | | | | 707/723 |
| 2019/0156526 A1* | 5/2019 | Liu | ........................... | G06T 7/90 |

OTHER PUBLICATIONS

Yang, S., Liu, J., Lian, Z., & Guo, Z. (2017). Awesome typography: Statistics-based text effects transfer. In Proceedings of the IEEE Conference on Computer Vision and Pattern Recognition (pp. 7464-7473).

* cited by examiner

FONT CAPTURE FROM IMAGES OF TARGET DECORATIVE CHARACTER GLYPHS

BACKGROUND

Oftentimes, content creators (e.g., users) take inspiration from real-world objects when creating content. For instance, a user can take inspiration from the appearance of a font seen in the real world (i.e., a font of interest). As an example, a user might see a font on a menu that fits their vision for a font to use on a movie poster. The appearance of such a font can come from the stylization (e.g., shape/outline) of the font and/or the texture of the font. As such, a user can attempt to capture such a font of interest to derive a font for use in content.

SUMMARY

Embodiments of the present disclosure are directed towards generating captured fonts from an image of a target font. In particular, a font capture system of the present disclosure can determine a detailed representation of a captured font from the image of the target font. The detailed representation of the captured font (e.g., using a character mask) can be based on stylization (e.g., shape/outline) of the font. Further, such a detailed representation of the captured font can be based on a texture taken from the target font.

The font capture system can generate a captured font from an image of a target font. In particular, a character mask can be generated for the target character of the target font from the image. The character mask can be a high-quality vectorization that imitates the target character from the target font. The character mask can be used to identify a font similar to the target font. A character from the similar font (e.g., corresponding to the target character) can be transformed to optimize various parameters of the similar font character to more closely match the character mask. Upon identifying optimized parameters, a captured font can be generated by extending the optimized parameters to all characters of the similar font. For instance, the captured font can be a vectorized version of the similar font having the optimized parameters. Finally, guided texture synthesis can transfer a texture from the image to the captured font.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1A:
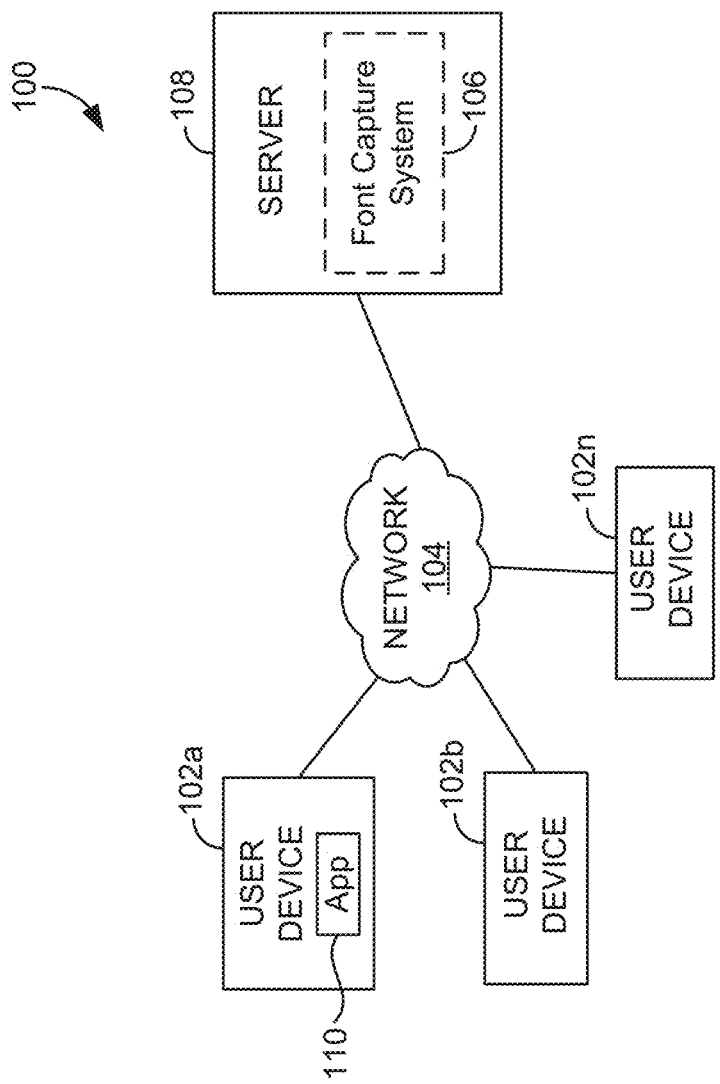
FIG. 1A depicts an example configuration of an operating environment in which some implementations of the present disclosure can be employed, in accordance with various embodiments.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

When creating content, users oftentimes want to utilize fonts (e.g., fonts of interest) seen in the real world to guide the appearance of fonts used in the content. For instance, a user may wish to create electronic content that uses a font similar to a font viewed in the real world. The appearance of such a font can come from the stylization (e.g., shape/outline) of the font and/or the texture of the font. As an example, a user might see a billboard with a font of interest that fits their vision for a font to use in a work presentation. As another example, a user might see a decorative sign with a font that they want to use for a poster. A user can attempt to capture an image of the font in order to derive a usable font (e.g., style and texture) from the image.

Conventional methods for obtaining a font seen in the real world have had limited success. In particular, conventional methods for generating fonts from images of fonts of interest typically result in low quality fonts. For instance, some conventional approaches attempt to automatically generate a font from an image by creating a rasterized mask and then running standard vectorization algorithms on the rasterizations. However, such approaches produce low quality rasterizations of the font that have low resolution. Such low resolution occurs because rasterized masks are created from the image itself that are then used to represent the font. Using a rasterized mask from the image means that the font can become blurry if the font is presented in a larger size than the size of the original image. Such low resolution fonts are not of sufficient quality for most content being created (e.g., such fonts are blurry at a desired resolution for most content). Other approaches that attempt to generate a font from an image often cannot handle the complexities of fonts of interest. In particular, a high level of manual manipulation and interaction with the image of the font is often required in an attempt to obtain a useable font (e.g., careful curation, masking, and manual selection of a desired font). As such, these approaches fail to allow for automatically generating high quality fonts from images of fonts of interest.

Accordingly, embodiments of the present disclosure present a solution that captures a font from an image of a target font (e.g., a font of interest seen in the real world). In particular, a font capture system of the present disclosure can determine a detailed representation of a captured font from the image of the target font. The detailed representation of the captured font (e.g., using a character mask) can be based on stylization (e.g., shape/outline) of target the font. Further, such a detailed representation of the captured font can be based on a texture taken from the target font. Determining such a detailed representation for the captured font allows the font to be rendered at any resolution (e.g., high resolution). It is advantageous to have a detailed representation that allows the captured font to be rendered at a high resolution because content often uses higher resolution fonts. For example, if a captured font can only be rendered at a low resolution, the font will be blurry when used in content. As such, the font capture system can generate a detailed representation of the captured font based on an accurate determination of the shape and style of one or more characters that make up the captured font.

At a high level, some implementations of the technology described herein are directed to a font capture system for capturing fonts from images of target fonts. In particular, embodiments of the present disclosure are directed towards generating a character mask for a character of a captured font from an image of the target font. The character mask can be a high-quality vectorization that imitates the character of the target font. The character mask can then be used to identify a font similar to the target font. For instance, the similar font can be a font available to a user that has undergone various parameter transformations to mirror the target font. In this way, the captured font can generally be a generated font (e.g., based on a similar font with parameter transformations to match the target font). Further, embodiments of the present disclosure are directed towards generating a texture reflecting an appearance of the captured font from the image. For instance, the texture can be a rasterized foreground/background in the appearance of the font.

In particular, aspects of the font capture system can be implemented using one or more neural networks. A neural network generally refers to a computational approach using large clusters of connected neurons. Neural networks are self-learning and trained rather than explicitly programmed such that a generated output of a neural network reflects a desired result. In particular, the font capture system can be comprised of a character detection neural network and a character mask neural network. As described herein, the font capture system can implement a character detection neural network to detect characters of a target font captured in an image using bounding boxes. The font capture system can also implement a character mask neural network to generate character masks related to a target font captured in an image.

In embodiments, the font capture system can be implemented to capture target fonts from images. In particular, the font capture system can be used to generate character masks related to a target font captured in an image. To implement the system, in some embodiments, the font capture system can receive an image of a target font. A character detection neural network of the font capture system can be used detect characters of the target font in the image (e.g. using bounding boxes). For example, the character detection neural network can use a trained Faster-RCNN (e.g., trained to detect characters in an image using bounding boxes). At least one detected character (e.g., based on the bounding boxes) can be selected as a target character.

In some instances, the selected target character can be received by a character mask neural network. The character mask neural network can then estimate a character mask for the target character. In some embodiments, the estimated character mask can be optimized (e.g., to sharpen the estimated character mask). The font capture system can then compare the estimated character mask of the target character with available fonts to identify a set of similar fonts (e.g., from a set of available fonts). The set of similar fonts can be transformed to optimize various parameters of the fonts to more closely match the estimated character mask (e.g., match a character mask "t" of a similar font to the estimated character mask "t" for the captured font). The parameters that can be transformed can include affine distortion, thickness, etc. Upon identifying optimized parameters, optimized characters (e.g., optimized character masks "t" represented in all of the similar fonts) can be presented for the all of similar fonts. One of the optimized characters of the similar fonts (e.g., that matches the appearance of the target character) can be selected to generate a captured font. In particular, the optimized parameters from the selected optimized character can be used to create a vectorized version of other characters (i.e., other alphanumeric characters or symbols other than the target character) by applying the optimized parameters to those other characters. In other words, a captured font can be generated by applying the optimized parameters to other characters to produce vectorized versions of all characters.

Further, the font capture system can generate a texture reflecting a style of the captured font from the image. In particular, guided texture synthesis can be used to represent the properties of the texture reflecting the appearance of the target font. Guidance fields (described below) can be created using a mask from the image and a mask of a character from the captured font (e.g., where the captured font is a vectorized version of an entire font with optimized parameters applied to the characters of the font). Then guided texture synthesis can apply the texture from the image to the character mask.

FIG. 1A depicts an example configuration of an operating environment in which some implementations of the present disclosure can be employed, in accordance with various embodiments. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 11.

It should be understood that operating environment 100 shown in FIG. 1A is an example of one suitable operating environment. Among other components not shown, operating environment 100 includes a number of user devices, such as user devices 102a and 102b through 102n, network 104, and server(s) 108. Each of the components shown in FIG. 1A may be implemented via any type of computing device, such as one or more of computing device 1100 described in connection to FIG. 11, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102a through 102n can be any type of computing device capable of being operated by a user. For example, in some implementations, user devices 102a through 102n are the type of computing device described in relation to FIG. 11. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1A. Application 110 is referred to as a single application for simplicity, but its functionality can be embodied by one or more applications in practice. As indicated above, the other user devices can include one or more applications similar to application 110. As an example, application 110 can be any one of ADOBE PHOTOSHOP, ADOBE ILLUSTRATOR, ADOBE CAPTURE, and ADOBE INDESIGN.

The application 110 may generally be any application capable of facilitating the exchange of information between the user devices and the server(s) 108 in carrying out font capture from an image of a target font. In some implementations, the application 110 comprises a web application, which can run in a web browser, and could be hosted at least partially on the server-side of environment 100. In addition, or instead, the application 110 can comprise a dedicated application, such as an application having image processing functionality. In some cases, the application 110 is integrated into the operating system (e.g., as a service). It is therefore contemplated herein that "application" be interpreted broadly.

In accordance with embodiments herein, the application 110 facilitates font capture from an image of a target font. In embodiments, an image is received of a target font. The image can be selected or input in any manner. For example, a user may take a picture using a camera function on a device. As another example, a desired image can be selected from a repository, for example, a repository stored in a data store accessible by a network or stored locally at the user device 102a. In other cases, an image may be automatically selected or detected. Based on the input image, (e.g., provided via a user device or server), a captured font can be generated. The captured font can be a high-quality vectorized font inspired by the target font. The captured font can be output to a user, for example, to the user via the user device 102a. For instance, in one embodiment, the captured font can be displayed via a display screen of the user device. In particular, the captured font can be a font with optimized parameters to match the target font. In other embodiments, the captured font can be automatically applied to text in an application.

As described herein, server 108 can facilitate font capture from an image of a target font via font capture system 106. Server 108 includes one or more processors, and one or more computer-readable media. The computer-readable media includes computer-readable instructions executable by the one or more processors. The instructions may optionally implement one or more components of font capture system 106, described in additional detail below.

Font capture system 106 can train and/or operate one or more neural networks. For instance, font capture system 106 can include a character detection neural network and a character mask neural network. Once trained, the character detection neural network can detect characters of a target font captured in an image (e.g., using bounding boxes). Once trained, the character mask neural network can generate character masks for a target font captured in an image.

For cloud-based implementations, the instructions on server 108 may implement one or more components of font capture system 106, and application 110 may be utilized by a user to interface with the functionality implemented on server(s) 108. In some cases, application 110 comprises a web browser. In other cases, server 108 may not be required, as further discussed with reference to FIG. 1B. For example, the components of font capture system 106 may be implemented completely on a user device, such as user device 102a. In this case, font capture system 106 may be embodied at least partially by the instructions corresponding to application 110.

Figure 1B:
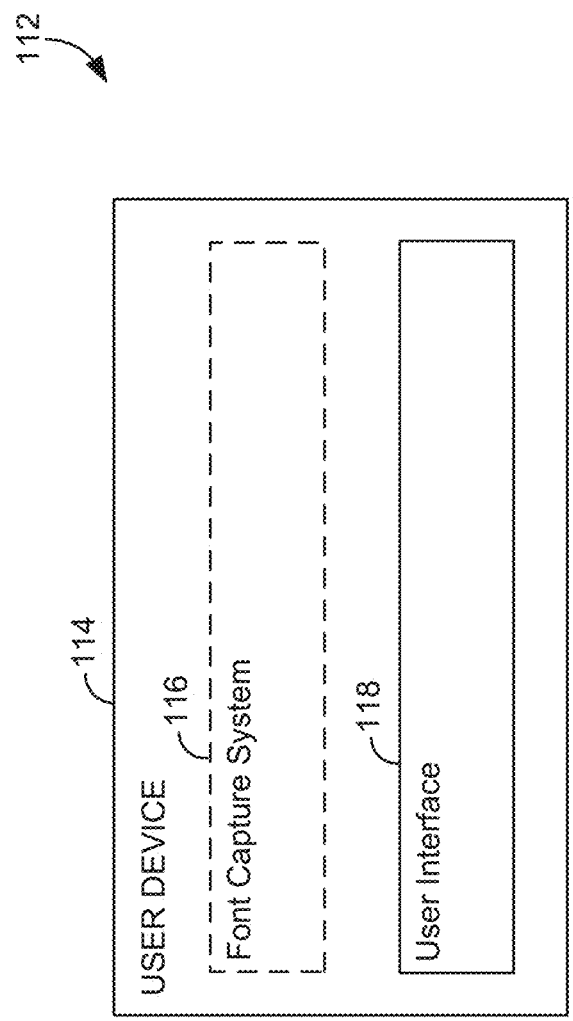
FIG. 1B depicts another example configuration of an operating environment in which some implementations of the present disclosure can be employed, in accordance with various embodiments.

Referring to FIG. 1B, aspects of an illustrative font capture system are shown, in accordance with various embodiments of the present disclosure. FIG. 1B depicts a user device 114, in accordance with an example embodiment, configured to allow for font capture from an image of a target font using a font capture system 116. The user device 114 may be the same or similar to the user device 102a-102n and may be configured to support the font capture system 116 (as a standalone or networked device). For example, the user device 114 may store and execute software/instructions to facilitate interactions between a user and the font capture system 116 via the user interface 118 of the user device.

A user device can be utilized by a user to perform font capture. In particular, a user can select and/or input an image of a target font utilizing user interface 118. An image can be selected or input in any manner. The user interface may facilitate the user accessing one or more stored images on the user device (e.g., in a photo library), and/or import images from remote devices and/or applications. As can be appreciated, images can be input without specific user selection. Images can include frames from a video. Based on the input and/or selected image, font capture system 116 can be used to perform font capture from an image of a target font using various techniques, some of which are further discussed below. User device 114 can also be utilized for displaying the captured font.

Figure 2:
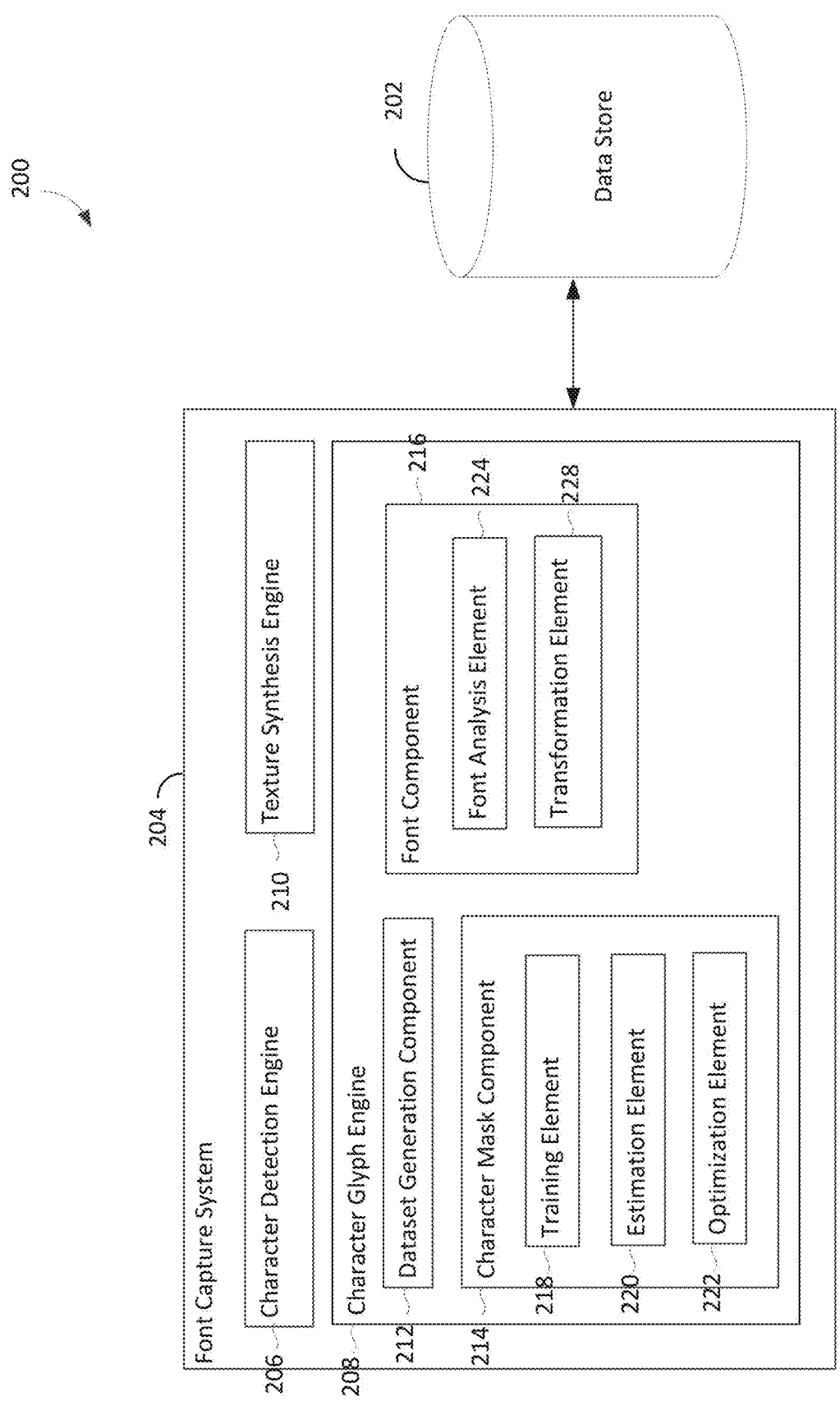
FIG. 2 depicts a further example configuration of an operating environment in which some implementations of the present disclosure can be employed, in accordance with various embodiments of the present disclosure.

FIG. 2 depicts another example configuration of an operating environment in which some implementations of the present disclosure can be employed, in accordance with various embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 11. It should be understood that operating environment 200 shown in FIG. 2 is an example of one suitable operating environment. Among other components not shown, operating environment 200 includes a number of user devices, networks, and server(s).

Font capture system 204 includes character detection engine 206, character glyph engine 208, and texture synthesis engine 210. The foregoing engines of font capture system 204 can be implemented, for example, in operating environment 100 of FIG. 1A and/or operating environment 112 of FIG. 1B. In particular, those engines may be integrated into any suitable combination of user devices 102a and 102b through 102n and server(s) 108 and/or user device 114. While the various engines are depicted as separate engines, it should be appreciated that a single engine can perform the functionality of all engines. Additionally, in implementations, the functionality of the engines can be performed using additional engines and/or components. Further, it should be appreciated that the functionality of the engines can be provided by a system separate from the font capture system.

As shown, font capture system 204 may operate in conjunction with data store 202. Data store 202 can store computer instructions (e.g., software program instructions, routines, or services), data, and/or models used in embodiments described herein. In some implementations, data store 202 can store information or data received via the various engines and/or components of font capture system 204 and provide the engines and/or components with access to that information or data, as needed. Although depicted as a single component, data store 202 may be embodied as one or more data stores. Further, the information in data store 202 may be distributed in any suitable manner across one or more data stores for storage (which may be hosted externally).

In embodiments, data stored in data store 202 may include images, detected characters, character masks (e.g., initial character masks and/or optimized character masks), available fonts, transformed corresponding characters, captured fonts, and captured textures. In some cases, data store 202 receives data from user devices (e.g., an image received by user device 102a or another device associated with a user, via, for example, application 110). In other cases, data is received from one or more data stores in the cloud.

An image of a target font can be received (e.g., for font capture of the target font) using font capture system 204. The image may be received, for instance, from a user at a user device. The user may select or input the image in any available manner. For example, a user may take a picture using a camera on a device, for example, user device 102a-102n and/or user device 114 of FIGS. 1A-1B. As another example, a user may select an image (e.g., picture) from a repository stored in a data store accessible by a network or stored locally at the user device 102a-102n and/or user device 114 of FIG. 1A-1B. In other embodiments, a user can input the image by inputting a link or URL to an image. The font capture system 204 can then capture the target font in such a received image.

Character detection engine 206 can analyze images. In particular, the character detection engine 206 can be used to analyze an image of a target font to detect characters of the target font. Characters can include letters, numbers, and/or symbols. Characters can be detected using various methods. For instance, in some implementations, the character detection engine can receive an image that contains characters of the target font and place bounding boxes around the characters. Specific methods for detecting characters are discussed further with reference to FIG. 4.

Character glyph engine 208 can generate a captured font based on an image of a target font. A captured font can be a high-quality vectorized font inspired by the target font. In particular, the captured front can have similar stylization (e.g., shape/outline) as the target font. For instance, the captured font can have a similar glyph structure to the target font. The similar glyph structure for the captured font can be estimated using at least one character glyph of the target font. Such a character glyph can generally be a particular visual representation of a character (e.g., based on a particular stylization of the font). In some implementations, the character glyph engine 208 estimates a character mask for the character glyph of the target font from the image (e.g., using a trained character mask neural network described further below). A character mask can generally be a vectorized outline or shape of a character glyph. The estimated character mask can be compared with available fonts to identify a similar font (e.g., from a set of available fonts). A character from the similar font (e.g., corresponding to the character mask related to the target font) can be transformed to optimize various parameters of the similar font character to more closely match the character mask related to the target font. Such parameters can include affine distortion (e.g., x-y scale, skew, shear), thickness of the character (e.g., erosion, growth of the mask boundary), etc. Transformations can be applied to a parameter of a character at different percentages to determine an optimized parameter. This can be performed for one or more of the parameters. Parameters and parameter optimization are discussed further with reference to FIGS. 2, 4, and 6. Upon identifying optimized parameters, a captured font can be generated by extending the optimized parameters to all characters of the similar font. For instance, the captured font can be a vectorized version having the optimized parameters.

As depicted, character glyph engine 208 may include dataset generation component 212, character mask component 214, and font component 216. The foregoing components of character glyph engine 208 can be implemented, for example, in operating environment 100 of FIG. 1A and/or operating environment 112 of FIG. 1B. In particular, these components may be integrated into any suitable combination of user devices 102a and 102b through 102n and server(s) 106 and/or user device 114. While the various components are depicted as separate components, it should be appreciated that a single component can perform the functionality of all components. Additionally, in implementations, the functionality of the components can be performed using additional components and/or engines. Further, it should be appreciated that the functionality of the components can be provided by an engine separate from the character glyph engine.

Dataset generation component 212 can be used to generate a dataset for use in training neural networks. Such neural networks can include a character detection neural network and a character mask neural network. In particular, a dataset for training the character detection neural network can be a synthetic dataset of characters with identified bounding boxes. Such a character detection neural network can be trained using Faster-RCNN. The character detection neural network is discussed in further detail with reference to FIG. 4.

The dataset generation component 212 can also be used to generate a dataset for use in training the character mask neural network (e.g., character mask neural network run using character mask component 214). The dataset can be comprised of training glyphs. Such training glyphs can be generated such that the character mask neural network can behave well in the real world on a full range of styles and textures that might be observed from a target font. A training glyph can comprise a bounding box around a decorative glyph in a natural (e.g., real-world) environment. In some instances, the training glyph can include overlapping letters (e.g., adjacent letters to the left and/or right). For example, a training glyph might include a full character along with a bit of another character. Including portions of other characters in a training glyph creates a more realistic dataset (e.g., target fonts).

To generate a dataset that can be used to train a robust character mask neural network, a large variety of textures, photographs, and fonts can be used. Generating the dataset can be performed using, for example, dataset generation component 212. Training the character mask neural network can be performed using, for example, character mask component 214. To generate a large training dataset, the textures, the photographs, and the fonts can be combined, composited, and/or stylized to generate the dataset. In particular, various stylization approaches can be used to mimic the approach taken when stylizing real characters. For instance, random cutoffs of positive and negative distance fields can be taken of a glyph. These cutoffs can be blended with either an original background or a new foreground texture. In addition, stylization technology can be applied to create beveled, shadowed, and/or outlined text (e.g., using ADOBE ILLUSTRATOR and/or ADOBE PHOTOSHOP). Further, random resizing, hue shifting, and other transformation from adjustment layers can be used to distort and color-shift foreground and background textures. Still further, random gradient generation calibration can be used to mimic artistic gradient effects on characters. Transparency can also be manipulated (e.g., compositing random background texture with random foreground texture using an alpha value that controls opacity of the foreground).

Figure 3:
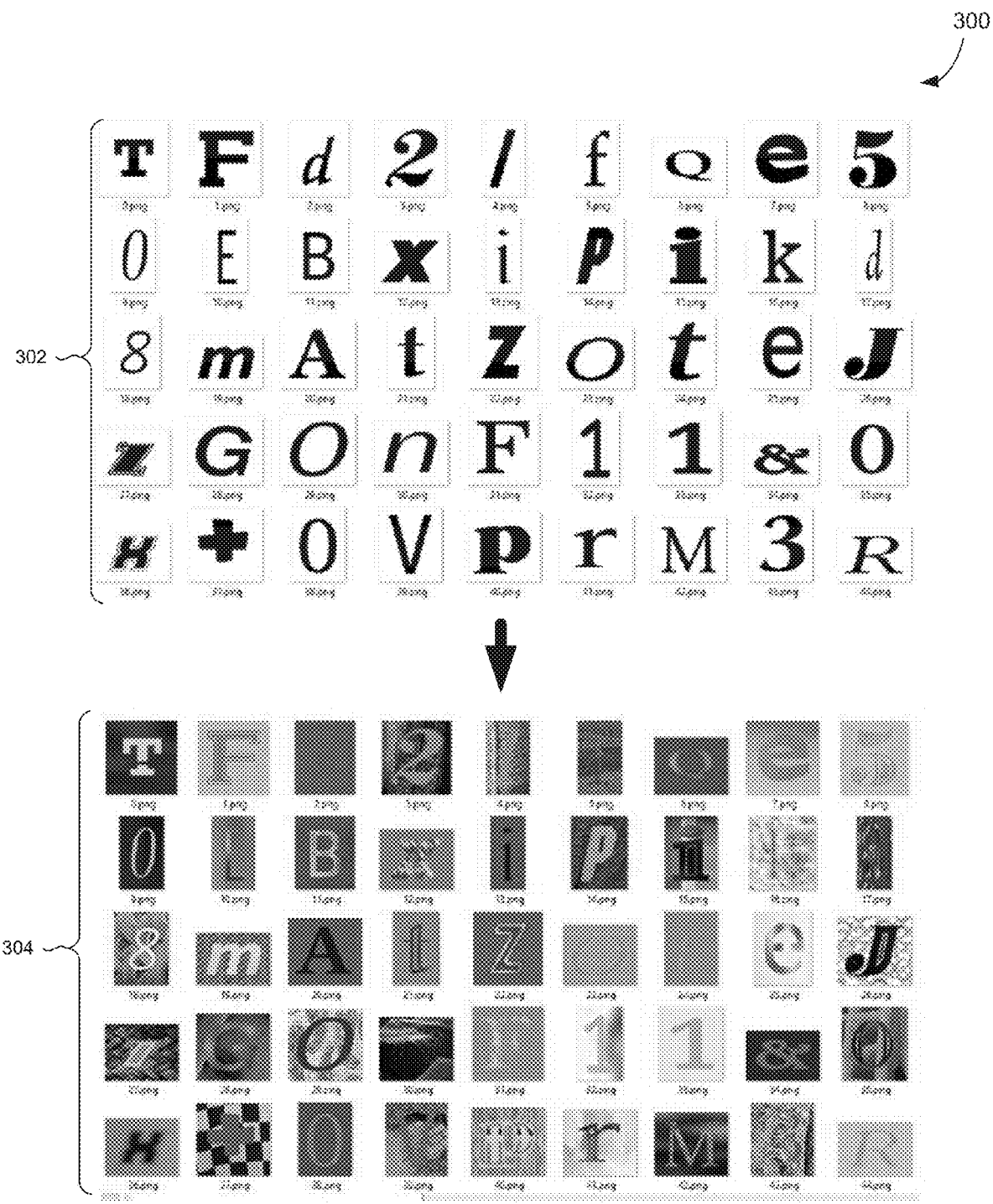
FIG. 3 illustrates an example training dataset generated for training a character mask neural network, in accordance with embodiments of the present disclosure.

As a non-limiting example, FIG. 3 illustrates an example training dataset 300 generated for training a character mask neural network, in accordance with embodiments of the present disclosure. In particular, character masks 302 can comprise ground-truth character masks. Ground-truth generally refers to an expected output based on a specific input that a neural network should generate when the network correctly generates an output (e.g., correctly generated character mask). Such ground-truth character masks can be compared with output from the character mask neural network to determine accuracy of the network (e.g., when the network is being trained). Such character masks 302 can be composited with various stylized or decorative backgrounds, as described above, to generate training glyphs 304. For instance, each of character masks 302 has a corresponding training glyph in training glyphs 304. Training glyphs 304 include various stylized or decorative backgrounds, shapes, photos, textures, etc. that are applied to the character masks 302. Training glyphs 304 can be generated using random cutoffs of positive and negative distance fields taken of character masks 302. These cutoffs can be blended with either an original background or a new foreground texture. In addition, random resizing, hue shifting, and other transformation from adjustment layers can be used to generate training glyphs 304. Further, training glyphs 304 can have random background textures composited with random foreground texture using an alpha value that controls opacity of the foreground. Such a dataset can be comprised of roughly 100,000 training glyphs.

Referring again to FIG. 2, the character mask component 214 can generate character masks for character glyphs. In particular, the character mask component 214 can estimate an initial character mask for a character glyph. To estimate the initial character mask, estimation element 220 can be used. In some embodiments, the initial character mask can be generated using, for example, a trained character mask neural network run using estimation element 220. Such a character mask neural network can be trained using, for example, training element 218. The character mask component 214 can then determine an optimal character mask from the initial character mask estimate (e.g., using optimization element 222). For instance, in some embodiments, the optimal character mask can be optimized based on user annotations. In some embodiments, character glyph engine 208 can determine a character mask for a character glyph in a single step.

As depicted, character mask component 214 may include training element 218, estimation element 220, and optimization element 222. The foregoing elements of character mask component 214 can be implemented, for example, in operating environment 100 of FIG. 1A and/or operating environment 112 of FIG. 1B. In particular, these elements may be integrated into any suitable combination of user devices 102a and 102b through 102n and server(s) 106 and/or user device 114. While the various elements are depicted as separate elements, it should be appreciated that a single element can perform the functionality of all elements. Additionally, in implementations, the functionality of the elements can be performed using additional elements, components, and/or engines. Further, it should be appreciated that the functionality of the elements can be provided by a component separate from the character mask component.

Training element 218 can be used to train the character mask neural network. Such a trained character mask neural network can be run using, for example, estimation element

220. The character mask neural network can be a standard generative adversarial network. For instance, the network can be comprised of a generator with three downsampling layers, five residual blocks, three upsampling layers and a discriminator with five two-stride convolutional blocks. Such a character mask neural network can be trained to receive an input of a training glyph (e.g., a bounding box around a detected character glyph from an image of a target font) and output a character mask. To train such a character mask neural network, the input training glyph can be from the dataset generated using, for example, character dataset generation component 212.

In a training iteration, training element 218 can input a training glyph into the network such that the network learns to output a character mask. Errors in the output character mask generated by the network can be determined such that the errors can be fed back through the network to appropriately train the network. Training element 218 can determine errors by comparing an output from the neural network against a ground-truth output (e.g., ground-truth character mask). In embodiments, errors can be determined using hinge loss (e.g., hingeGAN loss). Ground-truth generally refers to an expected output based on a specific input that a neural network should generate when the network correctly outputs a character mask (e.g., correctly generated character mask). Upon determining errors in the network during an iteration of training a network based on the ground-truth comparison, training element 218 can use the errors to adjust the weight of network parameters to reduce the value of the error. In this way, the network architecture can remain the same during training iterations, but the weights of the network parameters can be retrained (e.g., updated) during an iteration of training to reduce errors.

Iterations of training can be repeated by training element 218 for a sufficiently large number of training cycles. The dataset used to train the network can include, for example, approximately 50,000 training images and 30,000 validation images. In one embodiment, the network can be trained for 25 epochs. The network can be trained for one epoch and then a validation set used to evaluate the network for validation loss. In another embodiment, the network can be trained until five epochs in a row have validation loss of less than one percent Upon completion of training and validation of the character mask neural network by training element 218, estimation element 220 can use the trained network to output an initial character mask. An initial character mask can be estimated for a character glyph by performing foreground/background separation. More particularly, an initial character mask can be estimated by inputting a character into the character mask neural network. The character can be from the detected characters in the image of the target font (e.g., characters detected using character detection engine 206). The character can be a selected character (e.g., selected by a user). Estimating the initial character mask is discussed further with reference to FIGS. 4 and 5.

Optimization element 220 can be used to refine the initial character mask estimate into an optimal character mask. The optimal character mask can be determined using a fixed function algorithm (e.g., GrabCut). This optimal character mask can be based on an algorithm that uses color distribution to determine foreground/background separation. Color distribution can indicate that when two pixels are similarly colored, even if the pixels are elsewhere from each other, the pixels should have the same label (e.g., foreground or background). In one embodiment, a user can provide guides that can indicate regions that should or should not be included as part of the character mask (e.g., foreground). For example, a light green user annotation can indicate a high probability that a region should be included as part of the foreground (e.g., part of the character mask) and a red user annotation can indicate a high probability that a region should be part of the background (e.g., not part of the character mask). Estimating the optimized character mask is discussed further with reference to FIGS. 4 and 5.

Font component 216 can be used to generate a captured font. In particular, the font component 216 can take a character mask generated for a target font (e.g., using character mask component 214) and identify a set of similar fonts (e.g., from a set of available fonts). Font component 216 can then transform the set of similar fonts to optimize various parameters of the fonts to more closely match the character mask related to the target font. To generate the captured font (e.g., having similar stylization as the target font), the optimized parameters can be applied to the other characters in a selected font from the set of similar fonts. In this way, the captured font can be generated using the optimized parameters.

As depicted, font component 216 may include font analysis element 224 and transformation element 228. The foregoing elements of font component 216 can be implemented, for example, in operating environment 100 of FIG. 1A and/or operating environment 112 of FIG. 1B. In particular, these elements may be integrated into any suitable combination of user devices 102*a* and 102*b* through 102*n* and server(s) 106 and/or user device 114. While the various elements are depicted as separate elements, it should be appreciated that a single element can perform the functionality of all elements. Additionally, in implementations, the functionality of the elements can be performed using additional elements, components, and/or engines. Further, it should be appreciated that the functionality of the elements can be provided by a component separate from the font component.

Font analysis element 224 can compare a character mask with fonts. The character mask can be the initial character mask and/or the optimized character mask. The character mask can have a tight bounding box built around the character (e.g., letter, number or symbol of the selected character). In embodiments, the character can be resized to 32×32. The character mask can be identified as a particular character using, for example, a classification neural network (not pictured in FIG. 2). Such a classification neural network can be provided by a system separate from font capture system 204. The classification neural network can be trained to identify characters. As an example, the classification neural network can use a 52 dimension vector output indicating probability of a character being a specific upper- or lower-case letter. It should be appreciated that such a classification neural network can also be trained to identify numbers and/or symbols. Identifying the character mask as a particular character allows font analysis element 224 to select corresponding characters from fonts for analysis.

Such fonts used for comparison by font analysis element 224 can be a set of available fonts. For instance, available fonts can be fonts that a user has a license to use (e.g., an Apple Mac user can have licenses to a particular set of fonts, and a PC user can have licenses to another set of fonts, some of which may be the same as those licensed with a Mac). In particular, the character mask can be compared with corresponding characters from the available fonts. Similarity can be determined using, for example, per-pixel similarity between each pixel of the character mask and each pixel of the characters of the available fonts. Comparing the character mask and the characters of fonts can identify a set of similar fonts. The set of similar fonts can be sorted by similarity of the corresponding characters to the character mask. For instance, the top 20 similar fonts can be identified (e.g., based on similarity of the character corresponding to the character mask).

Transformation element 228 can be used to transform the set of similar fonts identified by font analysis element 224. In particular, the corresponding character of the set of similar fonts can be transformed to optimize various parameters of the characters to more closely match the character mask. Such transformations of parameters can include affine distortion (e.g., x-y scale, skew, shear), thickness of the character (e.g., erosion, growth of the mask boundary), etc. For instance, transformations can be applied to a character at different percentages (e.g., 1% shear up to 20% shear). As the various transformation parameters are applied to the character of each of the set of similar fonts, similarity between the transformed character and the character mask can be analyzed (e.g., using F1 loss). As an example, to enable Helvetica to appear more like a character mask of the captured font, the corresponding character rendered in Helvetica can be distorted (e.g., shrunk in x-direction, rotated, eroded, etc.) until it more closely resembles the character mask of the captured font.

Upon identifying optimized parameters for the corresponding character for the set of similar fonts, transformation element 228 can present optimized characters (e.g., the corresponding character having the optimized parameters) for the set of similar fonts. One of the optimized characters can be selected to generate a captured font. In particular, transformation element 228 can generate a captured font based on the optimized parameters of a selected optimized character. Such a captured font can be the vectorized version of the entire font with the optimized parameters. For example, the captured font can be comprised of letters, numbers, and/or symbols with the optimized parameters applied.

Texture synthesis engine 210 can generate a texture reflecting an appearance of an image. For instance, the texture synthesis engine can generate a texture reflecting an appearance of a target font. In particular, guided texture synthesis can be used to represent the properties of the appearance of the target font. Guided texture synthesis can be used to apply a texture from an image (e.g., of the target font) to, for instance, the captured font. Guidance channels can be created using a mask from an image (e.g., of the target font) and a mask of a character from the captured font (e.g., the vectorized version of the entire font). Then guided texture synthesis can be used to transfer the texture from the image to the character. In particular, guidance channels can be constructed from both a "source" mask (e.g., from the image) and a "target" mask (e.g., the character mask). Guided texture synthesis can then be used to generate a final texture between the "source" mask and the "target" mask. Generating the texture is discussed further with reference to FIGS. 4, 7, and 10.

Figure 4:
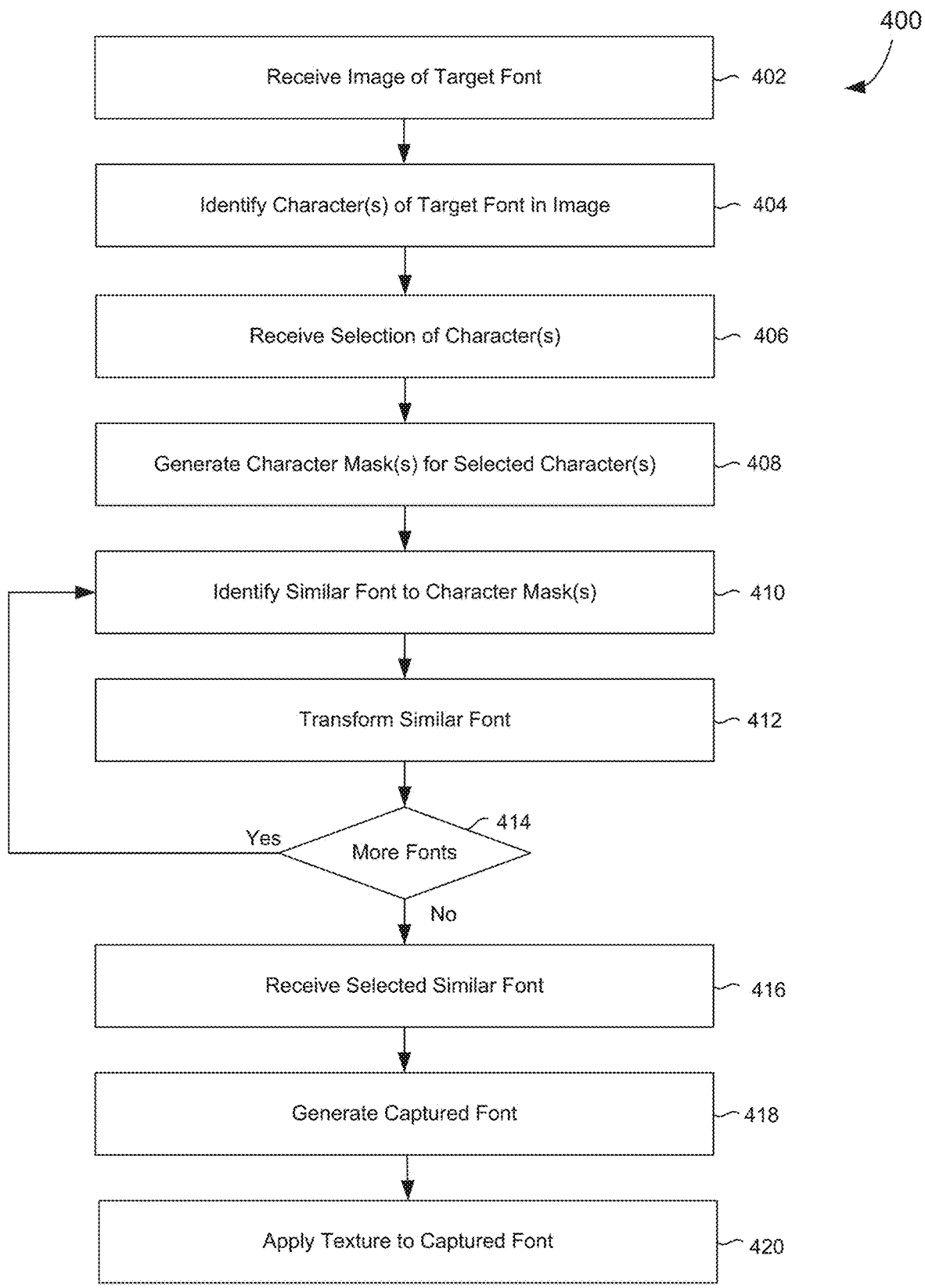
FIG. 4 depicts a process flow of an example for capturing a font from an image of a target font, in accordance with various embodiments of the present disclosure.

Turning now to FIG. 4, a process flow is provided of a method 400 depicting an example for capturing a font from an image of a target font, in accordance with various embodiments of the present disclosure. Process flow 400 can be carried out, for example by the operating environment and system as discussed with reference to FIGS. 1A, 1B, and 2.

As depicted, process flow 400 begins at block 402 where an image of a target font is received. Such an image can be a photograph of decorative characters. The image can be selected or input in any manner. For example, a user may take a picture using a camera function on a device. The image can be also be received from, for example, data store 202 of FIG. 2 and/or from a database stored in the cloud.

At block 404, characters (e.g., character glyphs) of the target font in the image can be identified. Characters can include letters, numbers, and or symbols. Characters can be detected using, for example, a character detection neural network (e.g., using character detection engine 206). For instance, in some implementations, the character detection neural network can receive an image that contains characters. The character detection neural network can then place bounding boxes around the characters in the image. The bounding boxes around the characters can be presented (e.g., to a user). The presented bounding boxes can be corrected and/or fixed (e.g., by the user). At block 406, a character(s) can be selected from the detected characters in the image. Selecting a detected character can be advantageous because an image can capture more than one fundamentally different target font (e.g., font style). As such, a user can select a character of interest from one of the fundamentally different font styles in the image (e.g., to generate a captured font in relation to the character of interest).

At block 408, a character mask(s) can be generated for a selected character(s). In some embodiments, an initial character mask can be generated by performing foreground/background separation (e.g., using character mask component 214 of character glyph engine 208). Such foreground/background separation can be performed using, for example, a trained character mask neural network. In some embodiments, an optimal character mask can then be generated from the initial character mask. For instance, the optimal character mask can be generated based on user annotations indicating regions of the character that should be included in the character mask (e.g., foreground) and regions of the image that should not be included in the character mask (e.g., background).

At block 410, a similar font to the character mask(s) can be identified. To identify a similar fonts the character mask can be compared with corresponding characters (e.g., same character as the character mask) of available fonts. Similarity can be determined using, for example, L1 similarity between the character mask and the corresponding characters of available fonts. L1 similarity can compute per-pixel similarity between each pixel of the character mask and the corresponding characters of the available fonts. Comparing the character mask and the corresponding characters of the available fonts can identify the similar font.

At block 412, the similar font can be transformed. For instance, the corresponding character of the similar font can be transformed. Transforming the corresponding character of the similar font optimizes various parameters of the corresponding character to more closely match the character mask. Such transformations of parameters can include affine distortion (e.g., x-y scale, skew, shear), thickness of the character (e.g., erosion, growth of the mask boundary), etc.

At block 414, if there are more available fonts, the process can return to block 410 where another font similar to the character mask(s) can be identified. At block 414, if there are not any more available fonts, the process can proceed to block 416 where a selected similar font can be received. The selected similar font can be selected from a list of top identified similar fonts (e.g., top 10 similar fonts, top 20 similar fonts, etc.). Similarity can be based on the corresponding character of the similar fonts. For the selected similar font, at block 418, a captured font can be generated. The captured font can be a vectorized version of the entire selected similar font. In particular, the captured font can be generated by applying the optimized parameters to each character of the selected similar font (e.g., determined by transforming the corresponding character of the similar font at block 412).

At block 420, texture can be applied to the entire font. The texture can reflect an appearance of the target font from the image. In particular, guided texture synthesis can be used to represent the properties of the texture of the target font. A set of guidance channels can be defined. The guidance channels can represent feature properties (e.g., spatial or otherwise) that should be preserved between the texture in the image and the output. For instance, four guidance channels can be used. The four guidance channels can be: the input mask, a two-sided distance field that indicates the positive/negative distance from a pixel to a character glyph boundary, an x feature map that indicate the relative x position within the character glyph, and a y feature map that indicate the relative y position within the character glyph. Such guidance channels can be constructed from both a "source" mask (e.g., from the image) and a "target" mask (e.g., the character mask). Guided texture synthesis can then be used to generate a final texture between the "source" mask and the "target" mask. Different weights can be used to optimize the contribution from each of the four guidance channels. In this way, the texture from the image can be transferred to the character mask. This texture transfer can then be extended to the other characters of the captured font.

Figure 5:
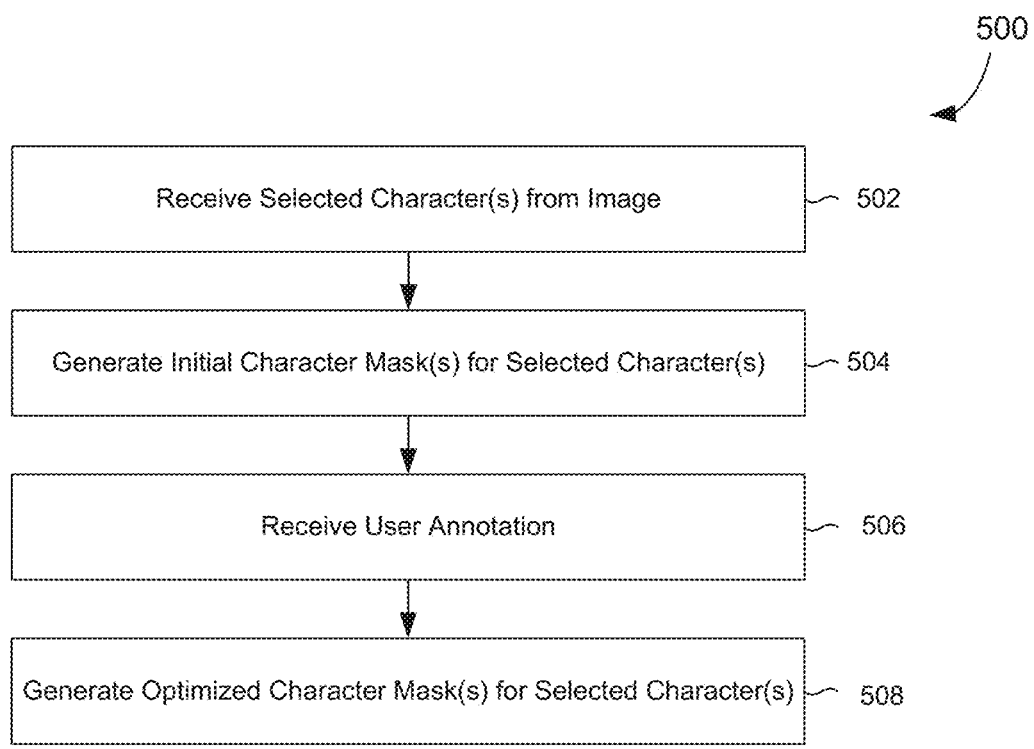
FIG. 5 depicts a process flow of an example for generating character mask(s) for a selected character(s) from an image, in accordance with various embodiments of the present disclosure.

FIG. 5 provides a process flow showing an embodiment of method 500 depicting an example for generating character mask(s) for a selected character(s) from an image, in accordance with various embodiments of the present disclosure. Such generation can be performed, for instance, using the character mask component 214 of character glyph engine 208 of font capture system 204 as described with reference to FIG. 2.

At block 502, a selected character(s) from an image is received. The character can be one of multiple characters detected in the image. Such characters can be detected using bounding boxes. In particular, the selected character can be one of the characters detected using bounding boxes. In an embodiment, a user can select the character. Such selection can take place using various methods. For instance, a user can interact with the image via a graphical user interface to select the character (e.g., click, tap, or otherwise indicate).

An initial character mask(s) for the selected character(s) can be generated at block 504. At a high level, a character mask can generally be a vectorized outline or shape of a character (e.g., character glyph). For instance, an initial character mask can be generated by performing foreground/background separation. Such foreground/background separation can be performed using, for example, a trained character mask neural network (e.g., using estimation element 220 of character mask component 214 of character glyph engine 208).

In some embodiments, user annotations can be received at block 506. In one embodiment, a user can provide annotations (e.g., guides) that can indicate regions that should or should not be included as part of the character mask. For example, one color of user annotation can indicate a high probability that a region should be included as part of the foreground (e.g., part of the character mask) and another color of user annotation can indicate a high probability that a region should be part of the background (e.g., not part of the character mask).

At block 508, an optimized character mask(s) for the selected character(s) can be generated. This optimal character mask can be based on an algorithm that uses color distribution to determine foreground/background separation. Color distribution means that when two pixels are similarly colored, even if the pixels are positioned elsewhere from each other, the pixels should have the same label (e.g., foreground or background). In some embodiments, foreground/background can be indicated using the user annotations (e.g., user annotations received at block 506).

Figure 6:
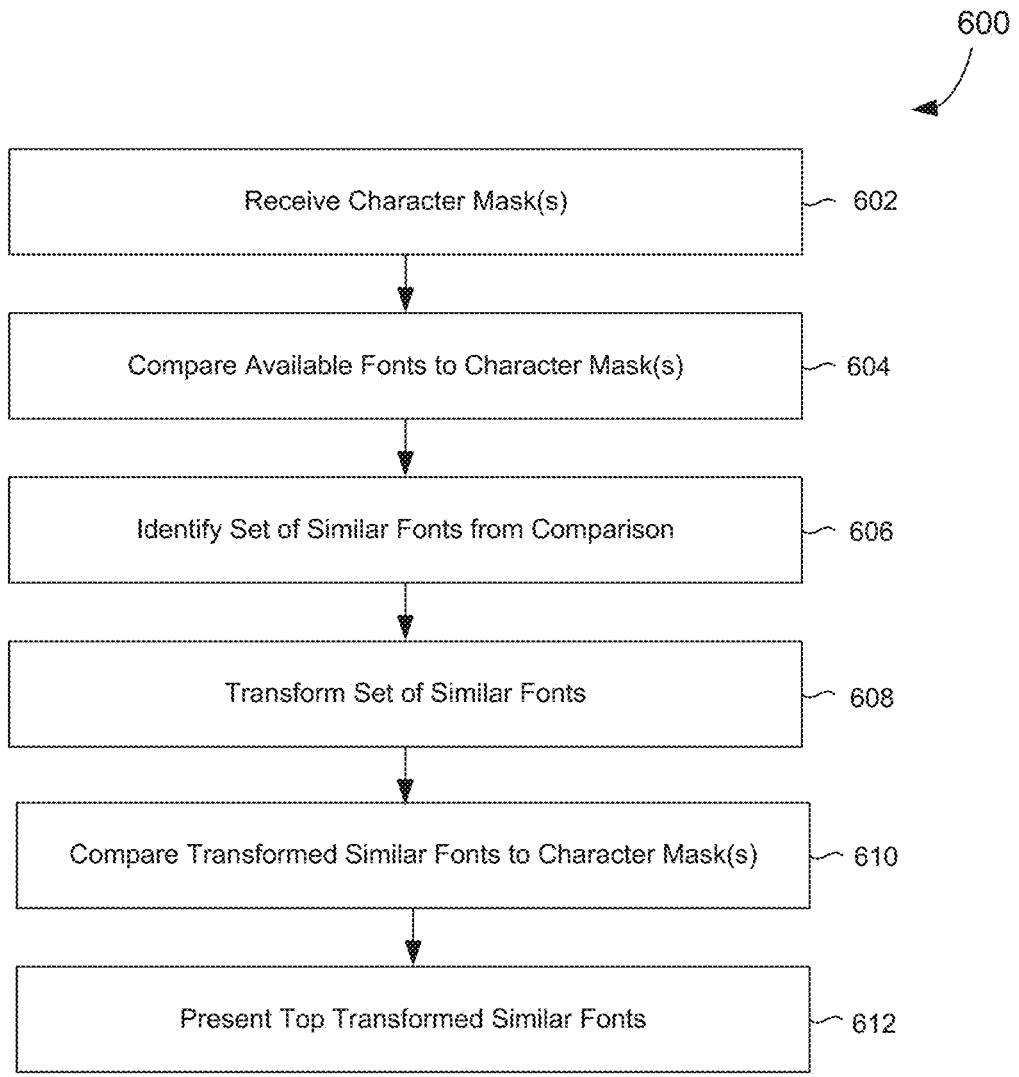
FIG. 6 depicts a process flow of an example for generating character mask(s) for a selected character(s) from an image, in accordance with various embodiments of the present disclosure, in accordance with various embodiments of the present disclosure.

FIG. 6 provides a process flow showing an embodiment of method 600 depicting an example for capturing a font from an image of a target font, in accordance with various embodiments of the present disclosure. Such determination can take place using font component 216 of character glyph engine 208 of font capture system 204 as described with reference to FIG. 2.

At block 602, a character mask(s) is received. The character mask(s) can be generated based on a character from an image of a target font. At block 604, the character mask(s) can be compared with available fonts. Available fonts can be fonts that a user has a license to use. To compare the available fonts, corresponding characters (e.g., the same character as the character mask) rendered in the available fonts can be used. At block 606, a set of similar fonts can be identified from the comparison. In particular, a character mask can be compared with the corresponding characters of the available fonts. Similarity can be determined using, for example, L1 similarity between the character mask and each corresponding character rendered in the available fonts. L1 similarity can compute per-pixel similarity between each pixel of the character mask and each pixel of the corresponding characters rendered in the available fonts. Comparing the character mask and the corresponding characters rendered in the available fonts can identify a set of similar fonts. The set of similar fonts can be sorted by similarity to the character mask (e.g., based on the computed similarity of the corresponding character for the set of similar fonts). For instance, the top 20 similar fonts can be identified.

At block 608, the set of similar fonts can be transformed. In particular, the corresponding characters rendered in the set of similar fonts can be transformed to optimize various parameters of the corresponding characters to more closely match the character mask. Such transformations can include adjustments of parameters such as affine distortion (e.g., x-y scale, skew, shear), thickness of the character (e.g., erosion, growth of the mask boundary), etc. For instance, transformations can be applied to a corresponding character rendered in a similar font at different percentages (e.g., 1% shear up to 20% shear).

At block 610, the transformed corresponding characters rendered in the similar fonts can be compared to the character mask(s). For instance, as the various transformation parameters are applied to the corresponding characters rendered in the set of similar fonts, similarity between the transformed corresponding characters and the character mask can be analyzed (e.g., using F1 loss). As an example, to obtain a corresponding character of Helvetica to appear more like a character mask of the captured font, the corresponding character rendered in Helvetica can be distorted (e.g., shrunk in x-direction, rotated, eroded, etc.) until it visually resembles the character mask.

At block 612, the top transformed similar fonts can be presented. In one embodiment, the transformed corresponding characters rendered in the top transformed similar fonts can be presented. As an example, if the character mask is "K," various transformed versions of "K" can be rendered in and presented for the top similar fonts. Presenting the top transformed similar fonts in this manner allows a user to view various options available from which to generate a captured font. For instance, if the top transformed font is Helvetica, but a user dislikes using Helvetica, the user can instead select one of the other top transformed fonts to use to generate the captured font.

Figure 7:
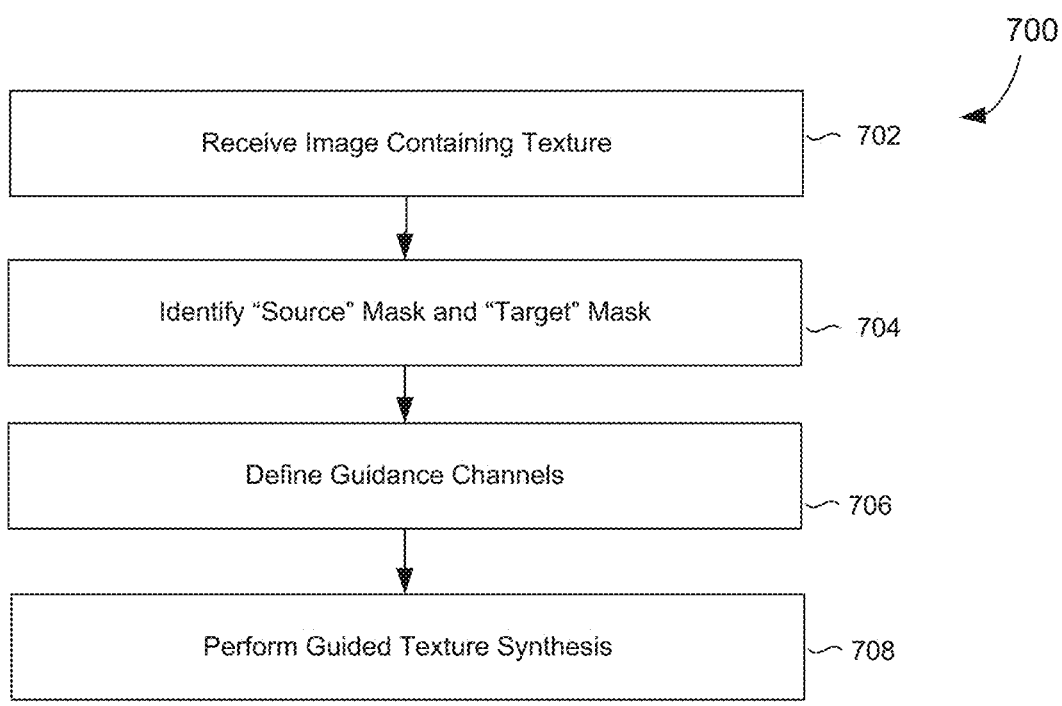
FIG. 7 depicts a process flow of an example for capturing a texture from an image, in accordance with various embodiments of the present disclosure.

FIG. 7 provides a process flow showing an embodiment of method 700 depicting an example for capturing a texture from an image, in accordance with various embodiments of the present disclosure. Such capturing can be performed, for instance, using texture synthesis engine 210 of font capture system 204 as described with reference to FIG. 2.

At block 702, an image is received. Such an image can be received from, for example, a data store and/or from a database stored in the cloud. The image can contain a texture of interest. In some embodiments, the texture can be a texture of a target font in the image. At block 704, a "source" mask and a "target" mask can be identified. The "source" mask can be from the image. For example, the "source" mask can be a portion of the image with a texture to capture. The "target" mask can be a character mask (e.g., a character mask generated based on a character of a target font in the image).

At block 706, guidance channels can be defined. The guidance channels can represent features and/or properties (e.g., spatial or otherwise) that should be preserved between the texture in the image and the output (e.g., "target" mask). The guidance channels can be: the input mask, a two-sided distance field that indicates the positive/negative distance from a pixel to a character glyph boundary, an x feature map that indicate the relative x position within the character glyph, and a y feature map that indicate the relative y position within the character glyph. These guidance channels can be used to build a four dimensional vector in the x-y space and in the textual space that can be used to assign colors (e.g., texture) from the "source" mask to the "target" mask. As an example, a color can be determined for a pixel in the "source" mask; for the corresponding coordinate in the "target" mask, the same color can be assigned. In this way, guided texture synthesis can transfer a local texture patch from a "source" mask to a "target" mask. This guided texture synthesis can be extended to assign textures to other characters of a captured font.

Figure 8:
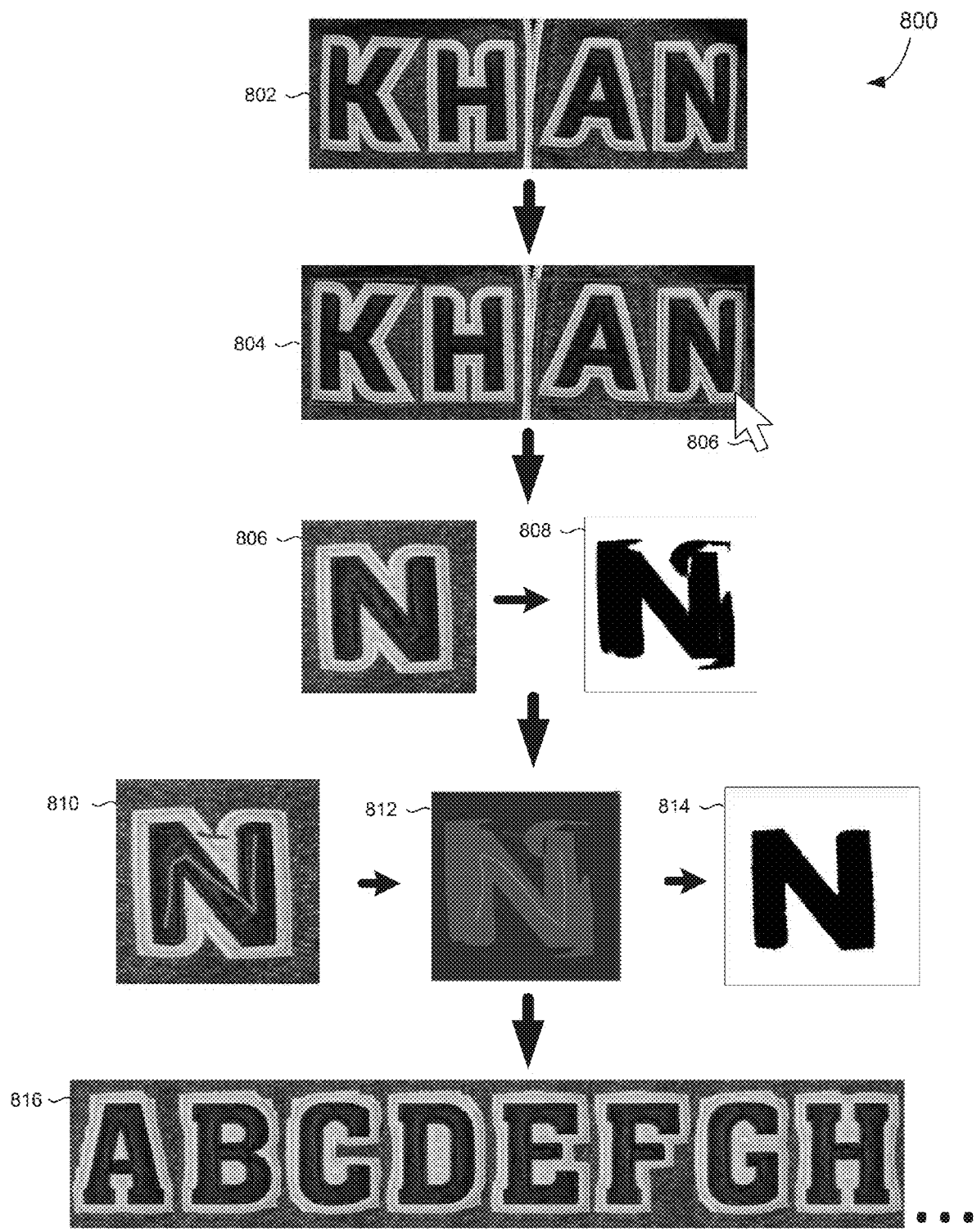
FIG. 8 illustrates an example of a font capture system generating a captured font from an image of a target font, in accordance with embodiments of the present disclosure.

FIG. 8 illustrates an example of a font capture system 800 generating a captured font from an image of a target font, in accordance with embodiments of the present disclosure such as those described above in connection with FIGS. 2-7. Image 802 can be input into the font capture system. As depicted, image 802 comprises four decorative characters rendered in the same target font (e.g., "K," "H," "A," and "N"). Image 802 can be input into a character detection neural network to detect characters using bounding boxes. For example, the character detection neural network can be a trained Faster-RCNN (e.g., trained to detect characters in an image using bounding boxes). Image 804 can indicate the detected characters (e.g., based on the bounding boxes). At least one detected character can be selected as a target character 806. Target character 806 can be input into a character mask neural network to estimate character mask 808 for the target character.

In some embodiments, the estimated character mask can be optimized (e.g., to sharpen the estimated character mask). In one embodiment, a user can provide annotations that can indicate regions that should or should not be included as part of the character mask. Target character with annotations 810 can be combined with the estimated character mask for estimated character mask with annotations 812 to generate optimized character mask 814. Optimized character mask 814 can be determined using a fixed function algorithm (e.g., GrabCut). This optimized character mask can be based on an algorithm that uses color distribution to determine foreground/background separation. Color distribution means that if two pixels are similarly colored, even if the pixels are positioned elsewhere from each other, the pixels should have the same label (e.g., foreground or background). For example, the light green user annotation of target character with annotations 810 can indicate a high probability that a region should be included as part of the foreground (e.g., part of the character mask) and the red user annotation of target character with annotations 810 can indicate a high probability that a region should be part of the background (e.g., not part of the character mask). The dark green region of estimated character mask with annotations 812 can indicate a region that the character mask neural network estimates as the character mask.

Optimized character mask 814 can be used to identify similar fonts. Various parameters of these fonts can be transformed to match optimized character mask 814. A vectorized version of the entire font can be generated using the optimized parameters of the similar font (e.g., captured font). Guided texture synthesis can be used to represent the properties of the texture of the captured font (e.g., from image 802). Guidance fields can be created using a mask from the image and a mask of a character from the captured. Then guided texture synthesis can transfer the texture from the image to entire font 816 (e.g., a texturized version of captured font).

Figure 9:
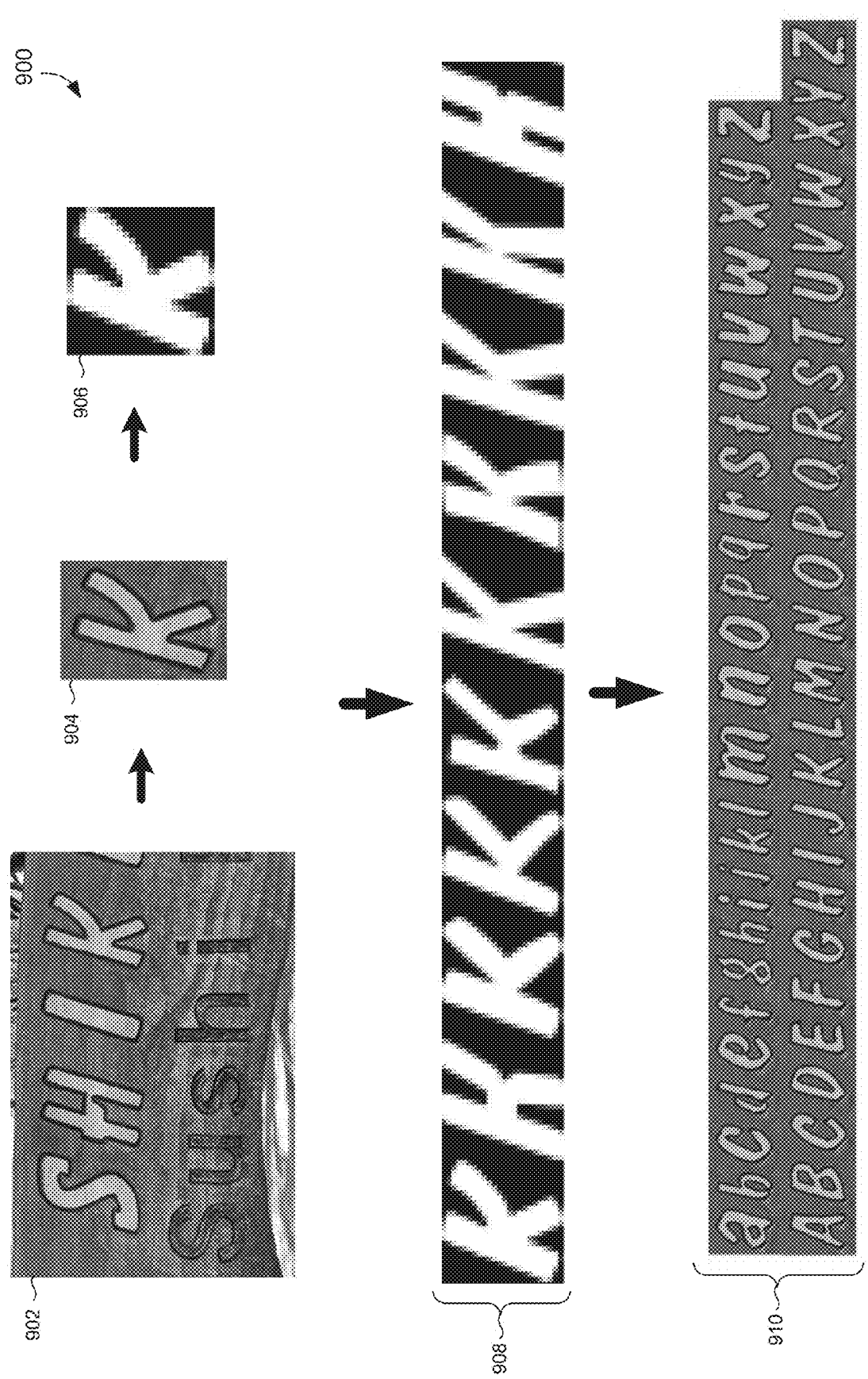
FIG. 9 illustrates an example of a font capture system generating a captured font from an image of a target font, in accordance with embodiments of the present disclosure.

FIG. 9 illustrates an example of a font capture system 900 generating a captured font from an image of a target font, in accordance with embodiments of the present disclosure. Image 902 can be input into the font capture system 900. As depicted, image 902 comprises decorative characters of the various target font with separate styles (e.g., decorative characters "SHIK" in a first style and decorative characters "Sushi" in a second style). Image 902 can be input into a character detection neural network to detect characters using bounding boxes. At least one detected character can be selected as a target character 904. In FIG. 9, target character 904 is shown as the letter "K." Target character 904 can be input into a character mask neural network to estimate character mask 906 for the target character.

Character mask 906 can be used to identify similar fonts 908. Various parameters of these fonts can then be transformed to match character mask 906, as explained above. Identified optimized parameters of a similar font from similar fonts 908 for matching character mask 906, can be used to generate a captured font. In particular, a captured font can be generated by applying optimized parameters to all characters of the similar font.

Texturized captured font 910 can be generated using guided texture synthesis for the captured font. As explained above in connection with FIG. 4, and below with FIG. 10, guided texture synthesis can be utilized to apply the texture from target character 904 to the captured font to generate texturized captured font 910. Guided texture synthesis can be used to represent the properties of the texture of the target font (e.g., from target character 904). Guidance fields can be created using a mask from the image (e.g., based on target character 904) and a mask of a character (e.g., based on character mask 906). Texturized captured font 910 can be a texturized vectorized version of the entire captured font.

Figure 10:
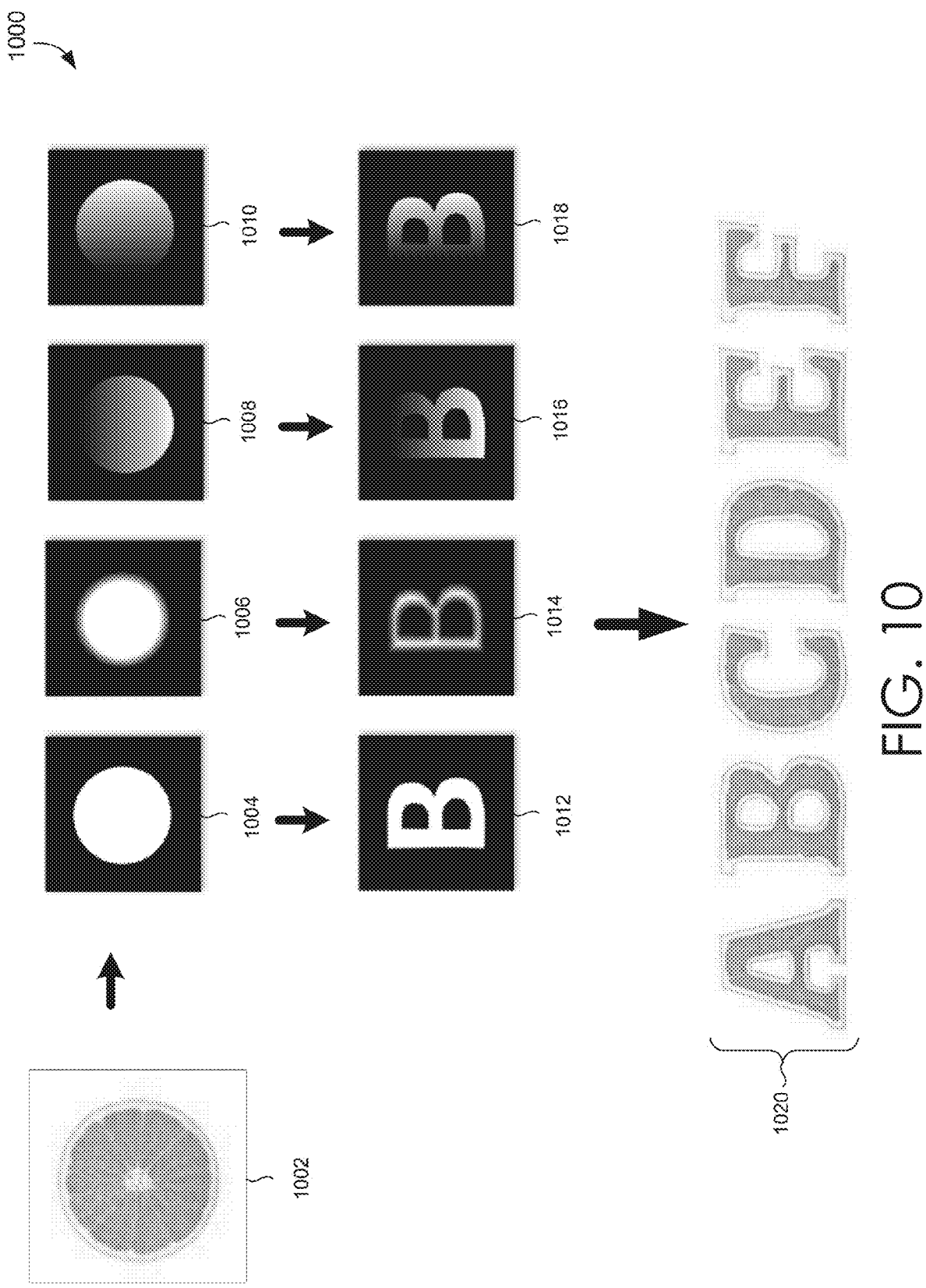
FIG. 10 depicts an example of a font capture system capturing a texture from an image, in accordance with embodiments of the present disclosure.

FIG. 10 illustrates an example of font capture system 1000 capturing a texture from an image, in accordance with embodiments of the present disclosure. Image 1002 can be input into the font capture system. As depicted, image 1002 comprises a texture (e.g., an orange). Guided texture synthesis can be used to represent the properties of the texture (e.g., from image 1002). In particular, guidance channels can be used to represent and transfer the properties of the texture from a "source" mask to a "target" mask. The guidance channels corresponding to the "source" mask can be: input mask 1004, two-sided distance field 1006 that indicates the positive/negative distance from a pixel to a character glyph boundary, x feature map 1008 that indicates the relative x position within the character glyph, and y feature map 1010 that indicates the relative y position within the character glyph. The guidance channels corresponding to the "target" mask can be: input mask 1012, two-sided distance field 1014, x feature map 1016, and y feature map 1018. Guided texture synthesis can transfer or apply a local texture patch from the "source" to the "target" using the guidance channels. In this way, guided texture synthesis can assign textures to other characters, as in characters 1020 rendered in a captured font with the desired texture of image 1002 applied.

Figure 11:
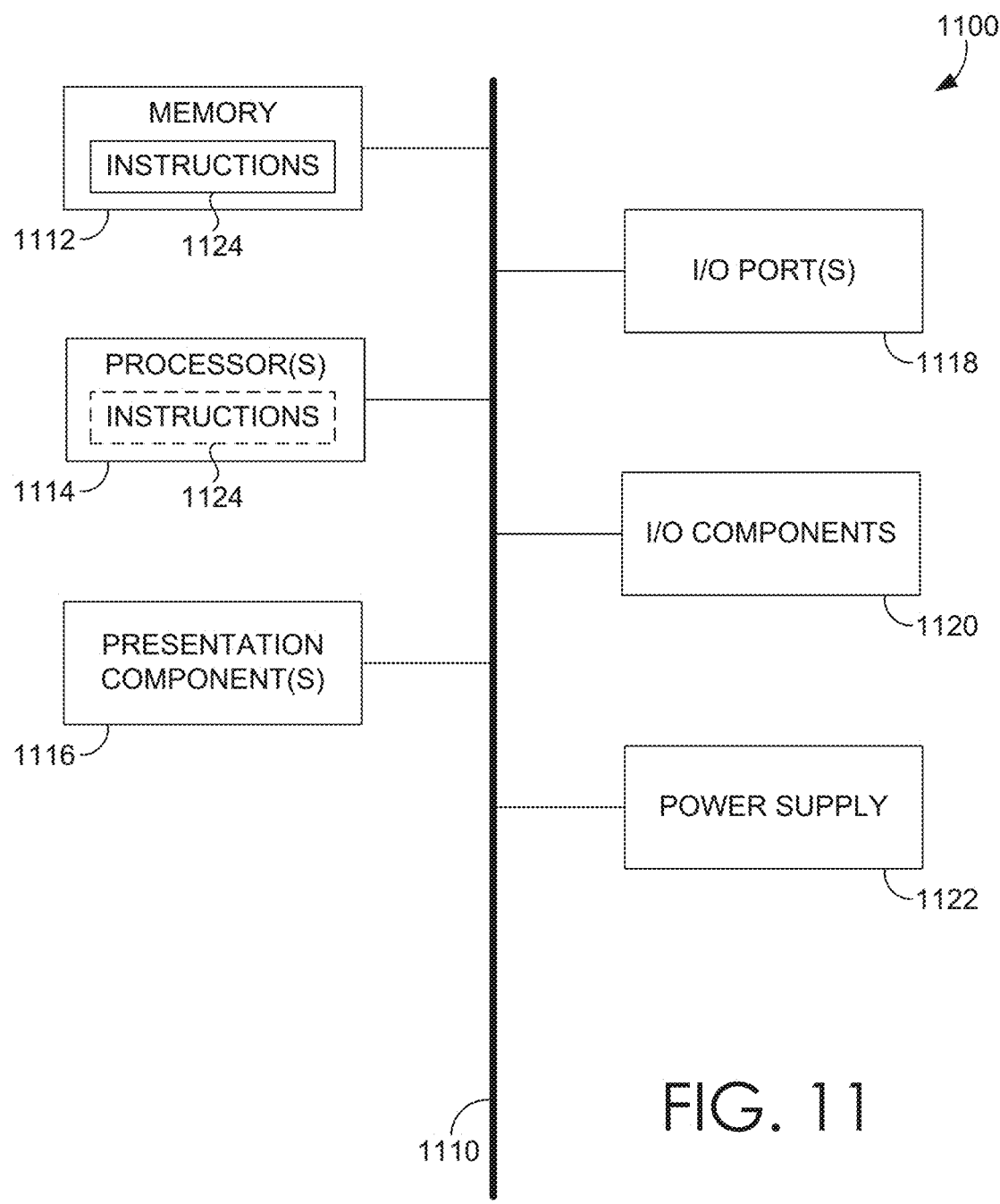
FIG. 11 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 11, an illustrative operating environment for implementing embodiments of the present invention is shown and designated generally as computing device 1100. Computing device 1100 is but one example of a suitable computing environment and is not intended to suggest any limitation as to the scope of use or functionality of the invention. Neither should the computing device 1100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 11, computing device 1100 includes a bus 1110 that directly or indirectly couples the following devices: memory 1112, one or more processors 1114, one or more presentation components 1116, input/output ports 1118, input/output components 1120, and an illustrative power supply 1122. Bus 1110 represents what may be one or more busses (such as an address bus, data bus, or combination thereof). Although the various blocks of FIG. 11 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 11 is merely illustrative of an example computing device that can be used in connection with one or more embodiments of the present disclosure. Distinction is not made between such categories as "workstation," "server," "laptop," "hand-held device," etc., as all are contemplated within the scope of FIG. 11 and reference to "computing device."

Computing device 1100 typically includes a variety of non-transitory computer-readable media. Non-transitory Computer-readable media can be any available media that can be accessed by computing device 1100 and includes both volatile and nonvolatile media, removable and non-removable media. By way of example, and not limitation, non-transitory computer-readable media may comprise non-transitory computer storage media and communication media.

Non-transitory computer storage media include volatile and nonvolatile, removable and non-removable media implemented in any method or technology for storage of information such as computer-readable instructions, data structures, program modules or other data. Non-transitory computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Non-transitory computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer storage media in the form of volatile and/or nonvolatile memory. As depicted, memory 1112 includes instructions 1124. Instructions 1124, when executed by processor(s) 1114 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Illustrative presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method, comprising:
   receiving an image of a target font;
   detecting one or more character glyphs of the target font from the image;
   receiving a selected character glyph from the one or more character glyphs;
   generating, using a character mask neural network trained to estimate a mask from an input character glyph, a character mask for the selected character glyph, wherein the character mask is a vectorized shape that imitates the selected character glyph;
   identifying a similar font relative to the target font based at least in part on comparing an appearance of the character mask and one or more characters of an available font;
   transforming a corresponding character rendered in the similar font to substantially match the character mask based on analyzing the similarity between the corresponding character and the character mask as one or more parameters of the corresponding character are adjusted;
   presenting the transformed corresponding character; and
   generating a captured font based at least in part on the transformed corresponding character, wherein the captured font is visually similar to the target font.

2. The computer-implemented method of claim 1, further comprising:
   identifying additional similar fonts relative to the target font based at least in part on the character mask;
   transforming corresponding characters rendered in the additional similar fonts to substantially match the character mask;
   presenting the transformed corresponding characters;
   receiving a selection of the transformed corresponding character; and
   generating the captured font in response to the selection of the transformed corresponding character.

3. The computer-implemented method of claim 2, further comprising:
   defining guidance channels for capturing a texture from the image of the target font; and
   performing guided texture synthesis using the guidance channels to apply the texture to the captured font.

4. The computer-implemented method of claim 1, wherein generating the character mask further comprises:
   generating, using the character mask neural network, an initial character mask; and
   generating an optimized character mask from the initial character mask, wherein the optimized character mask is the character mask.

5. The computer-implemented method of claim 4, wherein the optimized character mask is further based on one or more user annotations that indicate at least one of a first region should be included in the optimized character mask and a second region should not be included in the optimized character mask.

6. The computer-implemented method of claim 1, wherein identifying the similar font further comprises:
   determining a character of the selected character glyph related to the character mask; and
   comparing corresponding characters rendered in available fonts with the determined character related to the character mask; and
   identifying the similar font from the available fonts based on the comparison.

7. The computer-implemented method of claim 1, wherein detecting one or more character glyphs of the target font from the image comprises a character detection neural network using a bounding polygon around a potential character glyph from the image.

8. The computer-implemented method of claim 1, wherein generating the captured font further comprises:
   identifying optimized parameters of the transformed corresponding character; and
   applying the optimized parameters to the similar font.

9. The computer-implemented method of claim 1, wherein the image contains the target font and a t second target font, wherein a second similar font is identified based at least in part on comparing an appearance of a character mask of the second target font to an available font, the second similar font being different from the similar font.

10. One or more computer storage media storing computer-useable instructions that, when used by one or more computing devices, cause the one or more computing devices to perform operations comprising:
receiving a selected character glyph from one or more character glyphs in an image of a target font;
generating, using a character mask neural network trained to estimate a mask form an input character glyph, a character mask for the selected character glyph, wherein the character mask is a vectorized shape that imitates the selected character glyph, wherein the character mask indicates at least foreground and background separation for the selected character glyph;
identifying a similar font relative to the target font based at least in part on determining a per-pixel similarity between each pixel of the character mask and each pixel of one or more characters of an available font;
transforming a corresponding character rendered in the similar font to substantially match the character mask;
presenting the transformed corresponding character; and
generating the captured font based at least in part on the transformed corresponding character, wherein the captured font is visually similar to the target font.

11. The one or more computer storage media of claim 10, the operations further comprising:
receiving a selection to generate the captured font based on the transformed corresponding character; and
generating the captured font based on the transformed corresponding character.

12. The one or more computer storage media of claim 11, the operations further comprising:
defining guidance channels for capturing a texture from the image of the target font; and
performing guided texture synthesis using the guidance channels to apply the texture to the captured font.

13. The one or more computer storage media of claim 10, wherein generating the character mask further comprises:
generating, using the character mask neural network, an initial character mask; and
optimizing a character mask from the initial character mask by sharpening edges of the initial character mask.

14. The one or more computer storage media of claim 10, wherein identifying the similar font further comprises:
determining a character of the selected character glyph related to the character mask;
comparing corresponding characters rendered in available fonts with the determined character related to the character mask; and
identifying the similar font from the available fonts based on the comparison.

15. The one or more computer storage media of claim 10, wherein transforming the corresponding character comprises adjusting parameters of the corresponding character, the parameters including one or more of affine distortion and thickness.

16. The one or more computer storage media of claim 10, wherein generating the captured font further comprises:
identifying optimized parameters of the transformed corresponding character; and
applying the optimized parameters to the similar font.

17. The one or more computer storage media of claim 10, wherein the transformed corresponding character is presented to a user as a selectable option for generating a captured font.

18. A computing system comprising:
means for receiving an image; and
means for generating a captured font from a target font in the image, wherein the captured font is based at least in part on a transformed character that corresponds to a character mask, generated using a character mask neural network trained to estimate a mask from an input character glyph, comprising a shape of a glyph of a target character from the target font, wherein the captured font is visually similar to the target font.

19. The computing system of claim 18, further comprising:
means for generating a captured texture from the image, wherein the captured texture is based on guidance channels defined in relation to at least a portion of the image.

20. The computing system of claim 19, further comprising:
means for applying the captured texture to the captured font using guided texture synthesis, wherein the guided texture synthesis is based on the guidance channels.

* * * * *

UNITED STATES PATENT AND TRADEMARK OFFICE
CERTIFICATE OF CORRECTION

PATENT NO. : 11,126,788 B2  
APPLICATION NO. : 16/567724  
DATED : September 21, 2021  
INVENTOR(S) : Matthew David Fisher et al.

Page 1 of 1

It is certified that error appears in the above-identified patent and that said Letters Patent is hereby corrected as shown below:

In the Claims

In Column 22, Line 66, Claim 9, before "second" delete "t".

In Column 23, Line 11, Claim 10, delete "form" and insert -- from --, therefor.

Signed and Sealed this  
Eleventh Day of January, 2022

Drew Hirshfeld  
*Performing the Functions and Duties of the*  
*Under Secretary of Commerce for Intellectual Property and*  
*Director of the United States Patent and Trademark Office*